UNITED STATES PATENT OFFICE.

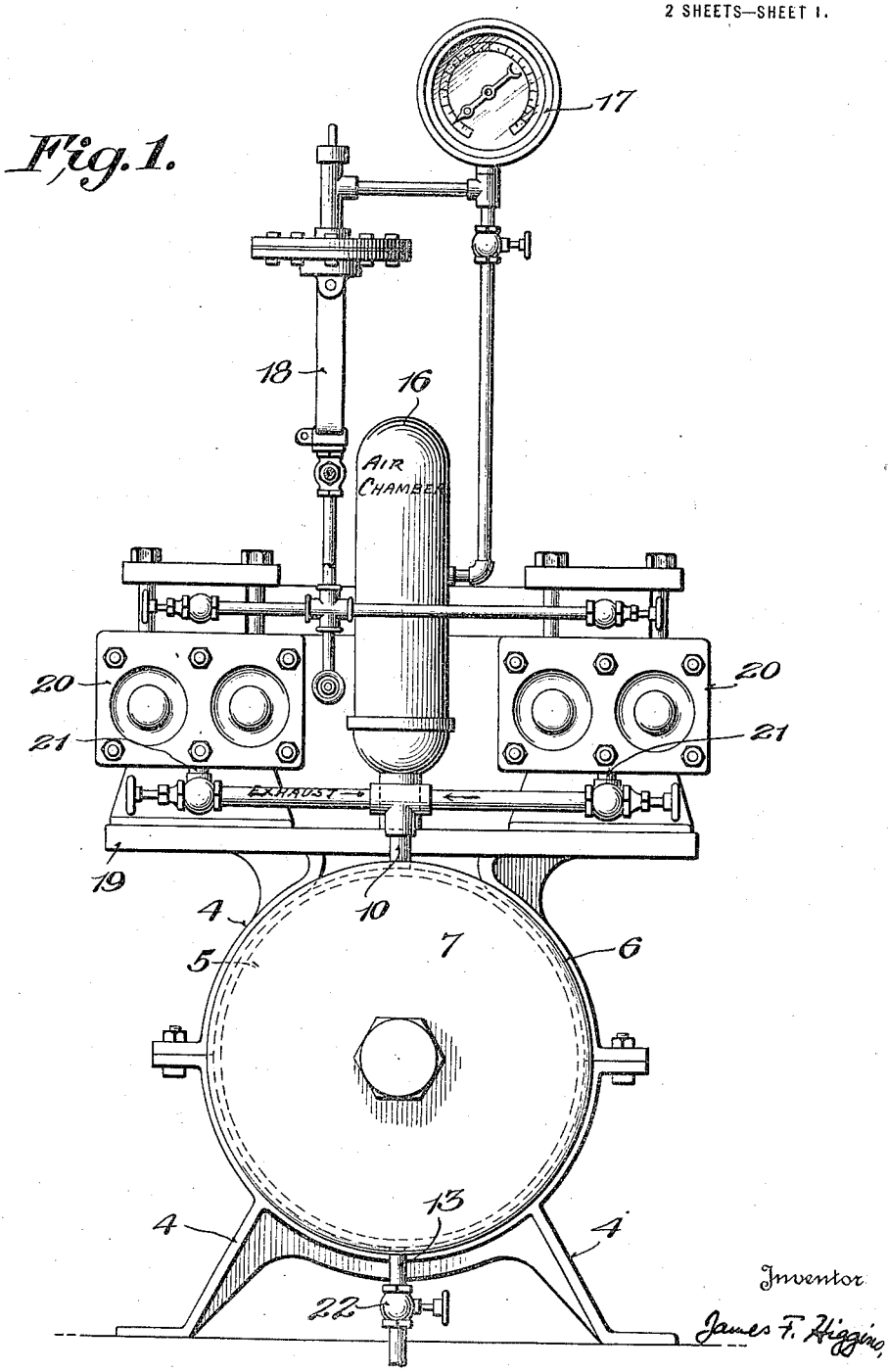

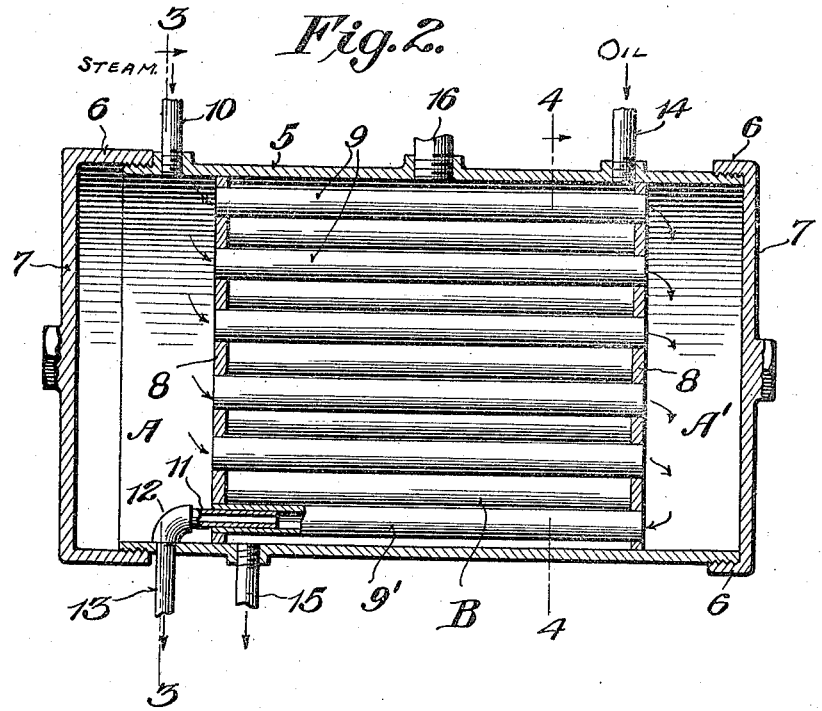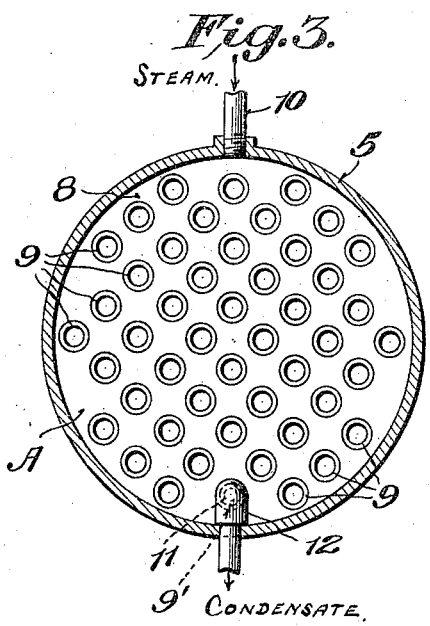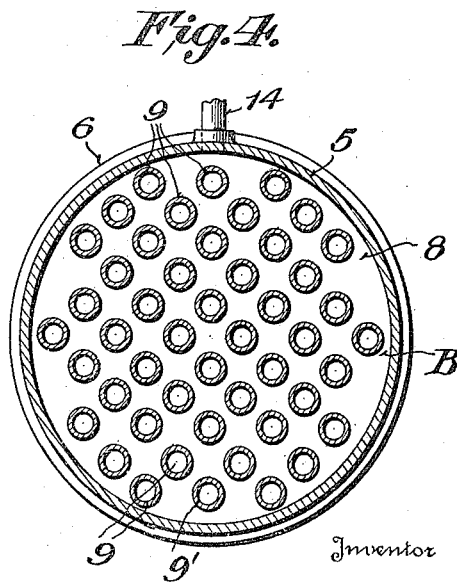

JAMES FRANKLIN HIGGINS, OF NEW ORLEANS, LOUISIANA, ASSIGNOR, BY MESNE ASSIGNMENTS, TO THE ROGERS-HIGGINS CO., INC., OF NEW ORLEANS, LOUISIANA, A CORPORATION OF LOUISIANA.

OIL-HEATER.

1,301,262.  Specification of Letters Patent.  Patented Apr. 22, 1919.

Application filed March 23, 1918. Serial No. 224,234.

*To all whom it may concern:*

Be it known that I, JAMES F. HIGGINS, a citizen of the United States, residing at New Orleans, in the parish of Orleans and State of Louisiana, have invented certain new and useful Improvements in Oil-Heaters, of which the following is a specification, reference being had therein to the accompanying drawings.

This invention relates particularly to liquid-heaters arranged to raise the temperature of fuel-oil prior to its introduction into a fire-box or other place of combustion.

The heater provided by the invention is so arranged as to constitute a support for an oil-pump, the exhaust-steam from which is delivered directly into and passed through the heater in such manner as to heat the oil delivered to the heater from the pump, the steam flowing through tubes in the heater and the oil passing through a chamber having the tubes disposed therein.

An air-chamber associated with a pressure-gage and a pump-governor is connected with the oil-chamber at its top, where the oil is not liable to reach and interfere with the action of the gage and governor.

The heater is constructed without gaskets that are liable to blow out, and no bolts are used in it. Heads are removably fitted at each end of the casing of the heater. As there are no fittings connected with the heads, they can be removed readily for inspection of the interior of the heater.

When read in connection with the description herein, the details of construction and arrangement of parts contemplated by the invention will be apparent from the accompanying drawings, forming part hereof, wherein an embodiment of the invention is disclosed, for purposes of illustration.

While the disclosures herein set forth are considered to exemplify a preferable embodiment of the invention, it is to be understood that it is not the intention to be limited necessarily thereto in interpretation of the claims, as modifications can be made within the limits of the claims without departing from the nature and spirit of the invention.

Like reference-characters refer to corresponding parts in the views of the drawings, of which—

Figure 1 is an end elevation;

Fig. 2 is a longitudinal sectional view of the casing;

Fig. 3 is a transverse sectional view on the line 3—3, Fig. 2; and

Fig. 4 is a transverse sectional view on the line 4—4, Fig. 2.

Having more particular reference to the drawings, 4 designates cradles including legs upon which a cylindircal casing 5 of the heater is supported. At each end the casing is exteriorly threaded to receive a correspondingly interiorly threaded annular flange 6 of a head 7, the heads closing the ends of, and having steam-tight joints with, the casing. As the heads can be removed by turning off from the casing and again placed in position in a similar manner, it is easy to have access to the interior of the casing for inspection, cleaning, and repair.

A partition 8 is disposed diametrically in each end portion of, and at its periphery has steam-tight connection with, the casing. The partitions divide the interior of the casing into steam-chambers A and A' at the ends and an intermediate oil-chamber B. Tubes 9 are set with steam-tight joints into the partitions, they extend between the partitions longitudinally through the oil-chamber, and they open at their ends to the steam-chambers.

Steam is admitted to one of the steam-chambers, for example to chamber A, through an inlet 10 in the upper portion of the casing, and it passes through the tubes 9 to the other steam-chamber, from which it goes through a return-tube 9', similar to the tubes 9 and located in a lower part of the oil-chamber, to an outlet-tube 11, which is connected by a steam-tight slip-joint with the tube 9'. The outlet-tube has in the chamber first receiving the steam an elbow 12, connected to an outlet-pipe 13, set with a threaded joint into the casing at a lower point thereof.

Oil is delivered through a pipe 14 at the top of the heater to the oil-chamber, and it is discharged through a pipe 15 leading from an outlet at the bottom of that chamber to the place of combustion.

A dome 16 containing an air-chamber opening to the oil-chamber at the top is located on top of the casing 5, and a pressure-gage 17 and a pump-governor 18 of any suitable types are connected with the air-chamber.

A bracket 19 is fixed to the upper portion of the casing, and it carries a steam-actuated pump 20, having a steam-exhaust pipe 21 connected with the inlet 10 and having its pump delivery-port connected with the pipe 14. The speed of the pump is controlled by the governor 18 in a manner common to the art of engine control.

Exhaust-steam from the pump entering one of the steam-chambers of the heater passes through the tubes 9 to the other steam-chamber, and therefrom through tube 9', outlet-tube 11, elbow 12, and outlet-pipe 13. Oil delivered from the pump through the pipe 14 passes around the tubes 9 in the oil-chamber and thence goes out through pipe 15 leading to the place of combustion.

A low back-pressure or relief valve 22, located in steam-outlet pipe 13, maintains a steam pressure of from one to five pounds in the heater and thus maintains a higher temperature in the oil-chamber. The steam-outlet being in the lower portion of the casing, the outlet-pipe 13 acts as a drain for water of condensation, and the necessity of providing separate drainage for the steam-spaces thereby is avoided.

As the oil-outlet pipe 15 leads from the lower point of the oil-chamber, there is little liability of the accumulation of sediment and small particles in that chamber, such foreign matter passing out through the pipe to the place of combustion without appreciable effect on fires or clogging of the burners.

The air-chamber in dome 16 cushions the pulsating discharge of oil from the pump into the oil-chamber and insures a substantially even flow therefrom, thus avoiding hydraulic hammer in the heater and pipe-lines and reducing danger of breakage therefrom. It also affords a convenient place for location of the pressure-gage and pump-governor, where they are affected by air or other gas within the chamber and are less liable to have their action interfered with by clogging or other causes than when viscous oil acts directly thereon.

Having thus described my invention, what a claim as new, and desire to secure by Letters Patent, is—

1. An oil-heater comprising a closed casing, partitions dividing the interior of the casing into end steam-chambers and an intermediate oil-chamber, tubes extending through the oil-chamber and opening through the partitions into the steam-chambers, a return-tube extending in the lower portion of the oil-chamber from one partition to the other and communicating at one end with one of the steam-chambers, and a pipe connected at the other end of the return-tube and leading from the heater, there being an inlet and outlet for the oil-chamber and an inlet to one of the steam-chambers.

2. An oil-heater comprising a cylindrical casing having removable heads, diametrical partitions dividing the interior of the casing into end steam-chambers and an intermediate oil-chamber, tubes extending through the oil-chamber and opening through the partitions into the steam-chambers, a return-tube extending in a lower portion of the oil-chamber from one partition to the other and communicating at one end with one of the steam-chambers, a pipe connected at the other end of the return-tube and leading from the heater, and a casing containing a pressure-chamber communicating with the upper portion of the oil-chamber and arranged to communicate with a pressure-gage and a pump-governor, there being an inlet to the top of the oil-chamber and an outlet from the bottom thereof and an inlet at the top of one of the steam-chambers.

3. An oil-heater comprising a casing, partitions dividing the casing into end steam-chambers and an intermediate oil-chamber, tubes extending through the oil-chamber and opening through the partitions into the steam-chambers, a return-tube extending in a lower portion of the oil-chamber from one partition to the other and communicating at one end with one of the steam-chambers, and a pipe leading through the other steam-chamber and having connection by a steam-tight slip-joint with the return-tube, there being an inlet and an outlet for the oil-chamber, and an inlet to the steam-chamber through which said pipe leads.

4. An oil pumping and heating apparatus comprising the combination of a closed casing, partitions dividing the casing into end steam-chambers and an intermediate oil-chamber, tubes extending through the oil-chamber and opening through the partitions into the steam-chambers, a return-tube extending in the lower portion of the oil-chamber from one partition to the other and communicating at one end with one of the steam-chambers, a pipe connected at the other end of the return-tube and leading from the heater, there being an inlet and an outlet for the oil-chamber and an inlet to one of the steam-chambers, a support carried by the casing, and a steam-actuated pump on said support arranged to deliver oil to said oil-chamber and exhaust-steam through said steam-chamber inlet.

5. An oil pumping and heating apparatus comprising the combination of a closed casing containing a steam-chamber having an inlet and outlet and an adjacent oil-chamber having an inlet and outlet, a casing containing an air-chamber communicating with the upper portion of the oil-chamber, a steam-actuated pump arranged to deliver oil to said oil-chamber and exhaust-steam to said steam-chamber, and a governor responsive to pressure in said air-chamber arranged to control said pump.

In testimony whereof I affix my signature in presence of two witnesses.

JAMES FRANKLIN HIGGINS.

Witnesses:
H. SCHNEIDER,
ROGER AMANEN.

Copies of this patent may be obtained for five cents each, by addressing the "Commissioner of Patents, Washington, D. C."